(12) United States Patent
Payne et al.

(10) Patent No.: US 11,354,347 B2
(45) Date of Patent: *Jun. 7, 2022

(54) MEDIA CONTENT DISCOVERY AND CHARACTER ORGANIZATION TECHNIQUES

(71) Applicant: The Nielsen Company (US), LLC, New York, NY (US)

(72) Inventors: Rachel Payne, Aliso Viejo, CA (US); Meghana Bhatt, Aliso Viejo, CA (US); Natasha Mohanty, Aliso Viejo, CA (US)

(73) Assignee: The Nielsen Company (US), LLC, New York, NY (US)

( * ) Notice: Subject to any disclaimer, the term of this patent is extended or adjusted under 35 U.S.C. 154(b) by 475 days.

This patent is subject to a terminal disclaimer.

(21) Appl. No.: 16/116,310

(22) Filed: Aug. 29, 2018

(65) Prior Publication Data

US 2018/0365240 A1 Dec. 20, 2018

Related U.S. Application Data

(63) Continuation of application No. 15/786,351, filed on Oct. 17, 2017, now Pat. No. 10,642,882, which is a (Continued)

(51) Int. Cl.
*G06F 16/435* (2019.01)
*G06F 16/43* (2019.01)
(Continued)

(52) U.S. Cl.
CPC ...... *G06F 16/435* (2019.01); *G06F 16/24578* (2019.01); *G06F 16/3334* (2019.01);
(Continued)

(58) Field of Classification Search
CPC ........ G06F 16/435; G06F 16/43; G06F 16/44; G06F 16/48; G06F 16/3334;
(Continued)

(56) References Cited

U.S. PATENT DOCUMENTS

| | | | |
|---|---|---|---|
| 7,970,922 B2 * | 6/2011 | Svendsen ........... | H04N 7/17318 709/231 |
| 8,150,695 B1 * | 4/2012 | Killalea ................ | G10L 13/033 704/270 |

(Continued)

FOREIGN PATENT DOCUMENTS

| | | |
|---|---|---|
| CN | 102945624 A | 2/2013 |
| CN | 105378720 A | 3/2016 |

(Continued)

OTHER PUBLICATIONS

Non-Final Office Action received for U.S. Appl. No. 15/132,197, dated Jun. 11, 2019, 14 pages.

(Continued)

*Primary Examiner* — Phong H Nguyen
(74) *Attorney, Agent, or Firm* — McDonnell Boehnen Hulbert & Berghoff LLP

(57) ABSTRACT

Techniques for recommending media are described. A character preference function comprising a plurality of preference coefficients is accessed. A first character model comprises a first set of attribute values for the plurality of attributes of a first character. The first and second characters are associated with a first and second salience value, respectively. A second character model comprises a second set of attribute values for the plurality of attributes of a second character of the plurality of characters. A first character rating is calculated using the plurality of preference coefficients and the first set of attribute values. A second character rating of the second character is calculated using the plurality of preference coefficients with the second set of (Continued)

attribute values. A media rating is calculated based on the first and second salience values and the first and second character ratings. A media is recommended based on the media rating.

17 Claims, 5 Drawing Sheets

Related U.S. Application Data continuation of application No. 15/238,677, filed on Aug. 16, 2016, now Pat. No. 9,805,034, which is a continuation of application No. 14/800,020, filed on Jul. 15, 2015, now Pat. No. 9,442,931, which is a continuation of application No. 14/466,882, filed on Aug. 22, 2014, now Pat. No. 9,122,684, which is a continuation of application No. 14/065,332, filed on Oct. 28, 2013, now Pat. No. 8,819,031, which is a continuation of application No. 13/844,125, filed on Mar. 15, 2013, now Pat. No. 8,572,097.

(51) Int. Cl.
*G06F 16/44* (2019.01)
*G06F 16/48* (2019.01)
*G06F 16/33* (2019.01)
*G06F 16/78* (2019.01)
*G06F 16/2457* (2019.01)
*G06F 16/68* (2019.01)

(52) U.S. Cl.
CPC .............. *G06F 16/43* (2019.01); *G06F 16/44* (2019.01); *G06F 16/48* (2019.01); *G06F 16/7867* (2019.01); *G06F 16/68* (2019.01); *G06F 16/78* (2019.01)

(58) Field of Classification Search
CPC ........... G06F 16/7867; G06F 16/24578; G06F 16/68; G06F 16/78
USPC ............... 707/722, 734, 748; 725/10, 46
See application file for complete search history.

(56) References Cited

U.S. PATENT DOCUMENTS

| | | | |
|---|---|---|---|
| 8,184,797 B1 | 5/2012 | Rosen | |
| 8,250,206 B2* | 8/2012 | Horii | G06F 16/00 709/224 |
| 8,260,117 B1 | 9/2012 | Xu et al. | |
| 8,298,087 B1 | 10/2012 | Smith | |
| 8,301,624 B2* | 10/2012 | Park | G06F 16/335 707/723 |
| 8,413,218 B1 | 4/2013 | Hopkins et al. | |
| 8,442,925 B2* | 5/2013 | Wang | G06F 16/60 706/12 |
| 8,572,097 B1 | 10/2013 | Payne et al. | |
| 8,701,139 B2* | 4/2014 | Scott | H04N 21/44222 725/40 |
| 8,819,031 B1 | 8/2014 | Payne et al. | |
| 8,825,574 B2* | 9/2014 | Bodor | G06Q 30/02 706/18 |
| 8,910,212 B2* | 12/2014 | Harris | A61N 5/0618 725/46 |
| 8,994,613 B1* | 3/2015 | Johnson | G06F 3/147 345/8 |
| 9,122,684 B2 | 9/2015 | Payne et al. | |
| 9,342,580 B2 | 5/2016 | Bhatt et al. | |
| 9,442,931 B2 | 9/2016 | Payne et al. | |
| 9,471,606 B1 | 10/2016 | Pedregal et al. | |
| 9,674,580 B2* | 6/2017 | Barker | H04N 21/812 |
| 9,792,640 B2 | 10/2017 | Meshulam et al. | |
| 9,805,034 B2 | 10/2017 | Payne et al. | |
| 10,642,882 B2 | 5/2020 | Payne et al. | |
| 2002/0199186 A1* | 12/2002 | Ali | H04N 21/6543 725/28 |
| 2004/0014527 A1 | 1/2004 | Orr | |
| 2004/0214642 A1 | 10/2004 | Beck | |
| 2006/0031115 A1* | 2/2006 | Eisma | G06Q 10/063112 705/7.14 |
| 2007/0130585 A1 | 6/2007 | Perret et al. | |
| 2007/0149282 A1* | 6/2007 | Lu | A63F 13/212 463/36 |
| 2007/0219984 A1 | 9/2007 | Aravamudan et al. | |
| 2008/0294375 A1* | 11/2008 | Van Breemen | G06Q 10/10 702/181 |
| 2009/0083362 A1 | 3/2009 | Svendsen | |
| 2009/0164199 A1* | 6/2009 | Amidon | H04N 21/654 703/17 |
| 2009/0193077 A1* | 7/2009 | Horii | G06F 16/00 709/203 |
| 2009/0282010 A1 | 11/2009 | Vasudevan | |
| 2009/0287685 A1 | 11/2009 | Charnock et al. | |
| 2009/0326947 A1* | 12/2009 | Arnold | G06Q 30/02 704/257 |
| 2010/0037255 A1* | 2/2010 | Sheehan | H04N 21/2389 725/34 |
| 2010/0057778 A1* | 3/2010 | Fein | H04L 12/2812 707/E17.009 |
| 2010/0100516 A1* | 4/2010 | Zhou | G06N 5/02 706/46 |
| 2010/0153885 A1 | 6/2010 | Yates | |
| 2010/0235351 A1 | 9/2010 | Iwasa | |
| 2010/0250556 A1* | 9/2010 | Park | G06F 16/335 707/749 |
| 2011/0107373 A1* | 5/2011 | Scott | H04N 21/251 725/40 |
| 2011/0122255 A1 | 5/2011 | Haritaoglu | |
| 2012/0030228 A1* | 2/2012 | Naidu | G06F 16/951 707/767 |
| 2012/0056752 A1* | 3/2012 | Baldwin | H04N 21/25891 340/870.01 |
| 2012/0060116 A1* | 3/2012 | Baldwin | H04N 21/4312 715/810 |
| 2012/0078830 A1* | 3/2012 | Bodor | G06Q 30/02 706/46 |
| 2012/0079516 A1 | 3/2012 | Phielipp | |
| 2012/0079529 A1* | 3/2012 | Harris | H04N 21/84 725/32 |
| 2012/0110087 A1* | 5/2012 | Culver | G06Q 10/103 709/205 |
| 2012/0136814 A1* | 5/2012 | Wang | G06F 16/60 706/12 |
| 2013/0028571 A1* | 1/2013 | Sato | H04N 5/76 386/230 |
| 2013/0054593 A1* | 2/2013 | Park | G06F 16/335 707/736 |
| 2013/0111526 A1* | 5/2013 | Glowaty | H04N 21/4826 725/53 |
| 2014/0059055 A1* | 2/2014 | Nag | G06F 16/24 707/748 |
| 2014/0075336 A1* | 3/2014 | Curtis | G06F 3/0481 715/753 |
| 2014/0149177 A1* | 5/2014 | Frank | G06F 40/30 705/7.29 |
| 2014/0164507 A1 | 6/2014 | Tesch et al. | |
| 2014/0215017 A1 | 7/2014 | Yeh | |
| 2014/0380359 A1* | 12/2014 | Musil | H04N 21/252 725/34 |
| 2015/0058327 A1* | 2/2015 | Frank | G06F 40/30 707/722 |
| 2015/0099589 A1 | 4/2015 | Smith | |
| 2016/0104486 A1* | 4/2016 | Penilla | G10L 15/005 704/232 |
| 2016/0232160 A1 | 8/2016 | Buhrmann et al. | |
| 2016/0306872 A1 | 10/2016 | Bhatt et al. | |
| 2018/0137122 A1 | 5/2018 | Payne et al. | |
| 2018/0373715 A1 | 12/2018 | Payne et al. | |
| 2018/0373716 A1 | 12/2018 | Payne et al. | |

(56) References Cited

U.S. PATENT DOCUMENTS

| | | | |
|---|---|---|---|
| 2019/0005039 A1 | 1/2019 | Payne et al. | |
| 2019/0012368 A1 | 1/2019 | Bhatt et al. | |
| 2019/0034521 A1 | 1/2019 | Bhatt et al. | |
| 2020/0265077 A1 | 8/2020 | Payne et al. | |

FOREIGN PATENT DOCUMENTS

| | | | |
|---|---|---|---|
| EP | 2239670 A1 | 10/2010 | |
| EP | 2973297 A2 | 1/2016 | |
| EP | 3114846 A1 | 1/2017 | |
| WO | 2007/063468 A1 | 6/2007 | |
| WO | 2013/142538 A1 | 9/2013 | |

OTHER PUBLICATIONS

Non-Final Office Action received for U.S. Appl. No. 15/786,351, dated Oct. 27, 2020, 32 pages.
Final Office Action received for U.S. Appl. No. 15/132,197, dated Jan. 30, 2019, 18 Pages.
Notice of Allowance received for U.S. Appl. No. 13/844,125, dated Aug. 29, 2013, 18 pages.
Non-Final Office Action received for U.S. Appl. No. 14/065,332, dated Dec. 18, 2013, 11 pages.
Notice of Allowance received for U.S. Appl. No. 14/065,332, dated Apr. 25, 2014, 8 pages.
International Search Report and Written Opinion received for PCT Patent Application No. PCT/US2014/028582, dated Sep. 18, 2014, 7 pages.
Non-Final Office Action received for U.S. Appl. No. 14/466,882, dated Oct. 21, 2014, 12 pages.
Letter Restarting Period for Response received for U.S. Appl. No. 14/466,882, dated Nov. 21, 2014, 12 pages.
Notice of Allowance received for U.S. Appl. No. 14/466,882, dated May 14, 2015, 9 pages.
Invitation to Pay Additional Fees received for PCT Patent Application No. PCT/US2015/018511, dated May 21, 2015, 2 pages.
Non-Final Office Action received for U.S. Appl. No. 14/636,067, dated Jul. 9, 2015, 8 pages.
International Search Report and Written Opinion received for PCT Patent Application No. PCT/US2015/018511, dated Jul. 28, 2015, 11 pages.
International Preliminary Report on Patentability received for PCT Patent Application No. PCT/US2015/018511, dated Sep. 15, 2016, 8 pages.
International Preliminary Report on Patentability received for PCT Patent Application No. PCT/US2014/028582, dated Sep. 24, 2015, 6 pages.
Non-Final Office Action received for U.S. Appl. No. 14/800,020, dated Dec. 18, 2015, 21 pages.
Notice of Allowance received for U.S. Appl. No. 14/636,067, dated Jan. 13, 2016, 11 pages.
Notice of Allowance received for U.S. Appl. No. 14/800,020, dated May 16, 2016, 10 pages.
Extended European Search Report received for European Patent Application No. 14764486.8, dated Aug. 4, 2016, 8 pages.
Non-Final Office Action received for U.S. Appl. No. 15/238,677, dated Oct. 7, 2016, 14 pages.
Final Office Action received for U.S. Appl. No. 15/238,677, dated Apr. 6, 2017, 11 Pages.
Notice of Allowance received for U.S. Appl. No. 15/238,677, dated Jun. 21, 2017, 10 pages.
Extended European Search Report (includes Supplementary European Search Report and European Search Opinion) received for European Patent Application No. 15757812.1, dated Aug. 4, 2017, 8 pages.
Office Action received for European Patent Application No. 14764486. 8, dated Jan. 25, 2018, 8 pages.
Non-Final Office Action received for U.S. Appl. No. 15/132,197, dated Aug. 8, 2018, 20 pages.
Non-Final Office Action received for U.S. Appl. No. 15/786,351, dated Jul. 9, 2019, 35 pages.
Non-Final Office Action received for U.S. Appl. No. 16/123,238, dated Oct. 27, 2020, 18 pages.
Non-Final Office Action received for U.S. Appl. No. 16/116,250, dated Dec. 28, 2020, 22 pages.
Non-Final Office Action received for U.S. Appl. No. 16/116,281, dated Dec. 16, 2020, 27 pages.

* cited by examiner

Characters and their Attributes                Character Models

102                                                 116

( Sheldon: Male, Scientist, Unattractive, Unfriendly ) ⟶ (-1, 1, -1, -1)

104                                                 118

( Leonard: Male, Scientist, Neutral Attractive, Friendly ) ⟶ (-1, 1, 0, 1)

106                                                 120

( Penny: Female, Non-scientist, Attractive, Friendly ) ⟶ (1, -1, 1, 1)

108                                                 122

( Howard: Male, Scientist, Unattractive, Friendly ) ⟶ (-1, 1, -1, 1)

110                                                 124

( Rajesh: Male, Scientist, Neutral Attractive, Friendly ) ⟶ (-1, 1, 0, 1)

112                                                 126

( Bernadette: Female, Scientist, Attractive, Friendly ) ⟶ (1, 1, 1, 1)

114                                                 128

( Amy: Female, Scientist, Unattractive, Unfriendly ) ⟶ (1, 1, -1, -1)

FIG. 1

MEDIA CONTENT DISCOVERY AND CHARACTER ORGANIZATION TECHNIQUES

CROSS-REFERENCE TO RELATED APPLICATIONS

This disclosure is a Continuation of U.S. application Ser. No. 15/786,351, filed on Oct. 17, 2017, which is a Continuation of U.S. application Ser. No. 15/238,677, filed on Aug. 16, 2016, which issued as U.S. Pat. No. 9,805,034 on Oct. 31, 2017, which is a Continuation of U.S. application Ser. No. 14/800,020, filed on Jul. 15, 2015, which issued as U.S. Pat. No. 9,442,931 on Sep. 13, 2016, which is a Continuation of U.S. application Ser. No. 14/466,882, filed on Aug. 22, 2014, which issued as U.S. Pat. No. 9,122,684 on Sep. 1, 2015, which is a Continuation of U.S. application Ser. No. 14/065,332, filed on Oct. 28, 2013, which issued as U.S. Pat. No. 8,819,031 on Aug. 26, 2014, which is a Continuation of U.S. application Ser. No. 13/844,125, filed on Mar. 15, 2013, which issued as U.S. Pat. No. 8,572,097 on Oct. 29, 2013, the entirety of each of which is hereby incorporated by reference.

BACKGROUND

1. Field

The present disclosure relates generally to the field of media content discovery and, more particularly, to media content discovery using character decompositions.

2. Related Art

As media such as television shows and movies have become more ubiquitous and easily accessible in the everyday lives of consumers, the quantity and diversity of the media have also significantly increased. Previously, consumers were limited to a few television channels broadcasted by major television networks. As technology has progressed, various media are available for on-demand viewing at the convenience of consumers. As this on-demand ability has become more prevalent in the television industry (e.g., on-demand movies) and the personal computing industry (e.g., YouTube video streaming), consumers have become overwhelmed with the availability of choices at any one time. Similarly, consumers' ability to search through media to discover new content that meets their personal preferences and tastes has remained inefficient and ineffective.

Traditional techniques for discovering new media rely on friends and acquaintances suggesting media that they believe the consumer may enjoy. Alternatively, the consumer may see a preview for media that captures their attention or the consumer may view media because it includes a favorite actor or actress. However, these techniques have a significant drawback in that they use only a very narrow degree of precision in identifying content and can be unreliable. For example, although a favorite actress may play the role of an educated, humble, and empowering individual in one movie, the same actress may play the role of an illiterate, ill-mannered, and unfavorable individual in a subsequent movie. Therefore, understanding the qualities of characters is helpful for appreciating the media in which the characters appear.

Accordingly, techniques for efficiently and reliably decomposing the attributes of characters are advantageous.

BRIEF SUMMARY

Systems and processes for discovering and recommending media content are described. A set of salience values for a plurality of characters appearing in a media content are accessed. The set of salience values are associated with the media content. A character preference function of a user is accessed. The character preference function comprises information identifying a plurality of preference coefficients. Each preference coefficient of the plurality of preference coefficients is associated with at least one attribute of interest of a plurality of attributes. A first character model is accessed. The first character model comprises information identifying a first set of attribute values for the plurality of attributes of a first character of the plurality of characters. The first character is associated with a first salience value of the set of salience values. A second character model is accessed. The second character model comprises information identifying a second set of attribute values for the plurality of attributes of a second character of the plurality of characters. The second character is associated with a second salience value of the set of salience values. A first character rating of the first character is calculated by performing a summation of the products of the plurality of preference coefficients with the first set of attribute values. A second character rating of the second character is calculated by performing a summation of the products of the plurality of preference coefficients with the second set of attribute values. A media content rating is calculated based on the first salience value, the second salience value, the first character rating, and the second character rating. The media content is recommended to the user based on the media content rating.

BRIEF DESCRIPTION OF THE DRAWINGS

FIG. 1 illustrates character models in vector space for multiple characters.

DETAILED DESCRIPTION

Figure 2:
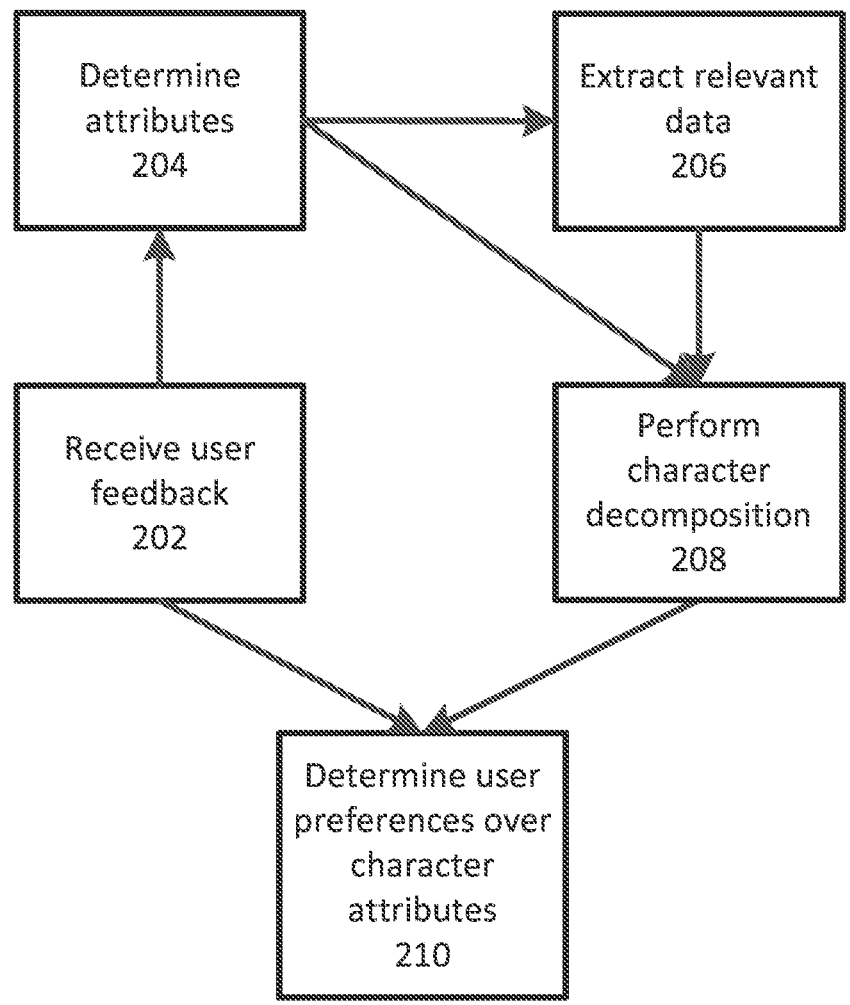
FIG. 2 illustrates an exemplary block diagram for performing discovery and organization of characters and media content.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the broadest scope consistent with the claims.

The embodiments described herein include technologies directed to enabling the organization and discovery of characters and media content based on the characters (or attributes of the characters) present in the media. Media and media content refer to content for storing or delivering information. For example, media content may include television shows, movies, YouTube videos, digital streaming Internet videos, books, poems, stories, audio files, advertisements, news, and the like.

A character refers to a persona. For example, characters may include politicians, actors/actresses, real-world persons, book characters, and the like. Attributes of characters refer to qualities of the characters. For example, the character's career (e.g., scientist, lawyer, doctor, secretary), demographic (e.g., age, gender, race, parental status), location (e.g., urban, rural), social traits (e.g., nice, loyal, funny, leader, popular, friendly), physical traits (e.g., tall, short, weight, attractiveness), intellectual traits (e.g., competent at a particular task, intelligent, hardworking, good at math), life traits (e.g., underdog, spoiled), and the like are attributes of characters. Attributes may be represented in a binary space, such as differentiating between a character being "nice" or "not nice." Attributes may also be represented in a continuous space, such as differentiating the degree to which a character is nice on a real number scale of 0 to 10, −10 to 10, 0 to 100, or the like.

A consumer may enjoy a particular television show because of the positive message portrayed by a character in the show. This positive message is often based on multiple attributes of the characters in the show, rather than strictly the characters' actions or the content of the character's verbal speech. For example, attractive female characters that are depicted as confident and intelligent portray a positive message. To understand why the consumer is attracted to a character, it is helpful to build a character model that captures the character's attributes. A character preference function based on the consumer's preferred attributes may also be developed by either directly eliciting why a particular consumer likes or relates to characters, or simply by inferring a preference function based on a set of preferred and/or non-preferred characters. Character models and character preference functions are used to recommend media to a consumer, rate the likelihood that a consumer will enjoy or respond to particular piece of content, recommend new characters to a consumer, recommend or deliver other content to the consumer, or rate the likelihood that a consumer will enjoy a particular character or piece of content.

Character Models in Vector Space

FIG. 1 illustrates character models in vector space for multiple characters. In FIG. 1, character models 116-128 are mapped out based on the attributes of the characters 102-114 from the television show The Big Bang Theory. The Big Bang Theory television show is a sitcom that brings together a wide array of characters ranging from geeky, intellectual characters with limited social skills to characters that are less educated, but socially adept. Each character model illustrated in FIG. 1 captures a multidimensional representation of the attributes of an associated character. In this example, each of the character models 116-128 is stored in the form of a vector. One of ordinary skill in the art will appreciate that the character models may be stored using various methodologies.

In the example of FIG. 1, the vectors for character models 116-128 are four-dimensional. The value in the first dimension of each character model is based on the character's gender, with female represented by 1 and male represented by a −1. The value in the second dimension of each character model is based on whether the character is a scientist, with scientist represented by 1 and non-scientist represented by −1. The value in the third dimension of each character model is based on the attractiveness of the character, with −1 representing unattractive, 0 representing neutral attractive, and 1 representing attractive. The value in the fourth dimension of each character model is based on whether the character is friendly, with 1 representing friendly and −1 representing unfriendly.

In The Big Bang Theory sitcom, Sheldon 102 is a male theoretical physicist researching quantum mechanics and string theory. Sheldon has B.S., M.S., M.A., Ph.D., and Sc.D. degrees. He is an unfriendly introvert who is physically unattractive. Sheldon's 102 attributes are mapped to vector 116. Vector 116 is (−1, 1, −1, −1). Vector 116 is annotated for clarity as (−1 [male], 1 [scientist], −1 [unattractive], −1 [unfriendly]).

Leonard 104 is a male physicist on The Big Bang Theory. He received his Ph.D. at the age of 24. His physical attractiveness is neutral, meaning he is neither attractive nor unattractive, and he is friendly. Leonard's 104 attributes are mapped to vector 118. Vector 118 is (−1, 1, 0, 1). Vector 118 is annotated for clarity as (−1 [male], 1 [scientist], 0 [neutral attractive], 1 [friendly]).

Penny 106 is a friendly, attractive, tall, blonde, female waitress who is pursuing a career in acting. Penny's 106 attributes are mapped to vector 120. Vector 120 is (1, −1, 1, 1). Vector 120 is annotated for clarity as (1 [female], −1 [nonscientist], 1 [attractive], 1 [friendly]).

Howard 108 is a male aerospace engineer and has an M.Eng. degree. He is socially outgoing and friendly but is physically unattractive. Howard's 108 attributes are mapped to vector 122. Vector 122 is (−1, 1, −1, 1). Vector 122 is annotated for clarity as (−1 [male], 1 [scientist], −1 [unattractive], 1 [friendly]).

Rajesh 110 is a male particle astrophysicist at Caltech and has a Ph.D. His physical attractiveness is neutral and he is friendly. Rajesh's 110 attributes are mapped to vector 124. Vector 124 is (−1, 1, 0, 1). Vector 124 is annotated for clarity as (−1 [male], 1 [scientist], 0 [neutral attractive], 1 [friendly]).

Bernadette 112 is a female with a Ph.D. in microbiology. She is both attractive and friendly. Bernadette's 112 attributes are mapped to vector 126. Vector 126 is (1, 1, 1, 1). Vector 126 is annotated for clarity as (1 [female], 1 [scientist], 1 [attractive], 1 [friendly]).

Amy 114 is a female who has a Ph.D. in neurobiology. She is unfriendly and physically unattractive. Amy's 114 attributes are mapped to vector 128. Vector 128 is (1, 1, −1, −1). Vector 128 is annotated for clarity as (1 [female], 1 [scientist], −1 [unattractive], −1 [unfriendly]).

Vector Space Driven Searches

Character models described in vector space may be used for various searches. In one example, character models 116-128 of FIG. 1 may be used to quickly and accurately identify all characters that exhibit a particular attribute. To identify all characters that are attractive, a search is conducted where an equality test is performed on the third element of the character model vectors. As discussed above and described in the example of FIG. 1, the third dimension (or third value) of each vector indicates the attractiveness of the associated character. All character models with a value greater than zero as the third dimension of the vector are associated with an attractive character. In the example of FIG. 1, Penny and Bernadette are quickly and accurately identified as being attractive by determining that they have an attractiveness value that is greater than 0.

Similarly, Sheldon, Howard, and Amy can be quickly and accurately identified as unattractive as they have an attractiveness value that is less than 0, indicating they are unattractive. As discussed above, the second dimension (or second value) of the character models 116-128 describe whether the character is a scientist or nonscientist. A search for all scientists would identify all character models with a value of 1 in the second dimension. In the example illustrated in FIG. 1, a search for scientists returns results for Sheldon, Leonard, Howard, Rajesh, Bernadette, and Amy—everyone except Penny.

Additionally, a search for a particular characteristic of a character may depend on multiple dimensions of the character model vector. For example, a search for a "scientist" may be conducted by identifying characters with character models that identify them as both "likes science" and "good at science."

Vector space may also be used to determine the distance between characters. This distance is representative of how related (similar or dissimilar) two characters are to each other. Several techniques may be employed to determine the distance between two characters.

Using a first technique, the distance d between a first character $\vec{x}$ associated with a first character model vector $(x_1,x_2,x_3,x_4)$ and a second character $\vec{y}$ associated with a second character model vector $(y_1,y_2,y_3,y_4)$ can be determined using the weighted Euclidean distance:

$$d(\vec{x},\vec{y}) = \sqrt{\beta_1(x_1-y_1)^2 + \beta_2(x_2-y_2)^2 + \beta_3(x_3-y_3)^2 + \beta_4(x_4-y_4)^2}$$

More generally, the weighted Euclidean distance d between a first character $\vec{x}$ and a second character $\vec{y}$ for an N-dimensional space can be calculated using the following equation:

$$d(x,y) = \sqrt{\sum_{i=1}^n \beta_i(x_i-y_i)^2}$$

As an example of this first technique, the distance between Sheldon and Leonard can be computed using the character models 116 and 118 of FIG. 1 as the following, assuming the weights $\beta_i=1$ for all i:

$$d(\text{Sheldon,Leonard}) = \sqrt{((-1)-(-1))^2+(1-1)^2+((-1)-0)^2+((-1)-1)^2} = \sqrt{5}$$

As illustrated by this calculation, elements of the character models that have the same value do not contribute to the distance. Thus, if two characters have identical character models, their distance will be 0. In the case of Sheldon and Leonard, they share many, but not all, attributes. In particular, the differences between Sheldon and Leonard are their attractiveness and their friendliness. The squared difference in friendliness has a larger contribution (i.e., 4) than the contribution (i.e., 1) resulting from the squared difference in attractiveness. As a result, the distance between the two characters is the square root of 5.

Using a second technique, the distance d between a first character $\vec{x}$ associated with a first character model vector $(x_1,x_2,x_3,x_4)$ and a second character $\vec{y}$ associated with a second character model vector $(y_1,y_2,y_3,y_4)$ can be determined by performing a comparison of values of the character models:

$$d(\vec{x},\vec{y}) = (x_1!=y_1)+(x_2!=y_2)+(x_3!=y_3)+(x_4!=y_4)$$

In this comparison, the result of two compared values is 1 when they are not equal. Similarly, the result of two compared values is 0 when they are equal. If $x_1$ and $y_1$ are not equal, the value of $(x_1!=y_1)$ will be 1. This will contribute a value of 1 to the distance $d(\vec{x},\vec{y})$. Alternatively, if $x_1$ and $y_1$ are equal, the value of $(x_1!=y_1)$ will be 0. This will not contribute to the distance $d(\vec{x},\vec{y})$. Accordingly, distance is less for characters using this second technique when the characters share attributes.

Once again, it might be true that certain axes are more important either in general, or to a specific user than others. This can once again be represented by a set of "weights" $\beta_i$. More generally, the distance d between a first character $\vec{x}$ and a second character $\vec{y}$ for an N-dimensional space can be calculated using the following equation:

$$d(\vec{x},\vec{y}) = \sum_{i=1}^n \beta_i(x_i!=y_i)$$

As an example of this second technique, the distance between Sheldon and Leonard can be computed using the character models 116 and 118 of FIG. 1 as the following:

$$d(\text{Sheldon,Leonard}) = ((-1)!=(-1))+(1!=1)+((-1)!=0)+((-1)!=1) = 2$$

As illustrated by this calculation, elements of the character models that have the same value do not contribute to the distance. Thus, if two characters have identical character models, their distance will be 0. In the case of Sheldon and Leonard, they share many, but not all, attributes. In particular, the differences between Howard and Rajesh are attractiveness and friendliness. The two differences each contribute the same amount to the distance (i.e., 1). As a result, the distance between the two characters is 2.

Both of these techniques use simple, symmetric functions often used to compute distances in vector spaces. However, in the case of characters it may be true that when computing the distance from a first character $\vec{x}$ to a second character $\vec{y}$ you may consider attributes "important" to character $\vec{x}$ more important, while when computing the converse distance from character $\vec{y}$ to character $\vec{x}$ you would consider attributes "important" to character $\vec{y}$. For example—we might decide that whenever a character was "neutral" on a particular attribute, the "weight" on that attribute is 0, and otherwise the "weight" on that attribute should be one. In this case the distance from Sheldon to Leonard:

$$d(\text{Sheldon,Leonard}) = (1(-1--1)^2 + 1(-1--1)^2 + 1(-1-0)^2 + 1(-1-1)^2 = \sqrt{5}$$

However, $$d(\text{Leonard,Sheldon}) = (1(-1--1)^2 + 1(-1--1)^2 + 0(0--1)^2 + 1(1--1)^2 = 2$$

Thus, the distance from Sheldon to Leonard is greater than the distance from Leonard to Sheldon because "appearance" is more salient to Sheldon's character than Leonard's. There are many other ways in which these distance functions might be complicated to accommodate features of the character space, or of the specific user.

In full generality, any function taking two elements in the character space to a scalar could be used as a distance function. For distance d:

$$d:(\mathbb{R}^n \times \mathbb{R}^n) \to \mathbb{R}$$

In another example, both the first and second techniques for determining distance between two characters will result in larger distances between Penny and Sheldon than were computed for Sheldon and Leonard. The distances between Penny and Sheldon will be at their maximum for the two techniques because Penny and Sheldon are exact opposites on all four dimensions of their character models.

As discussed above, the distance between characters represents the degree of similarity between the characters. Thus, when it is known that a consumer likes a particular character, a computing system can recommend additional characters that have a relatively low distance from the known character. The system may recommend all known characters that have a distance from the known character that is below a certain threshold. Alternatively, or in addition, the system may recommend X number of closest characters, where X is a threshold set by a user or determined by the system. Alternatively, or in addition, the system may recommend a ranked list based on level of relevancy or distance.

Developing Character Models

The character models 116-128 illustrated in FIG. 1 provide an example for a single television show. To develop character models for numerous characters spanning a large variety of media content, automated techniques, partially automated techniques, manual techniques, and their combinations are employed. Several techniques are discussed below, which may be used independently or in combination.

Semantic analysis of text may be used to develop character models. Text associated with a character is identified across different text-based media, such as Internet websites. Terms associated with the character are aggregated from the text. Semantic analysis techniques are then used to map the character onto the desired feature space. For example, a character model for Penny 106 may be developed using semantic analysis by identifying text associated with Penny 106. For example, text may be identified with a character when it is a certain number of words or less away from the character's name or image. Various terms, such as "engineer," "science," or "analytical," are aggregated from the identified text. These terms are mapped to the appropriate attribute of the character. In this case, the appropriate attribute is "scientist." In one example, each time a term maps to an attribute of the character, that character's attribute value increases by a determined amount—such as one. Similarly, when a term maps to the negative of an attribute of the character, such as "dislikes math," that character's attribute value decreases by a determined amount—such as one. In either case, the determined amount for increasing or decreasing the attribute value may be based on a strength value of the term. The term "engineer" may have a strength value of 0.25 while the term "gorgeous" has a strength value of 1.0. Similarly, "incredibly gorgeous" may have a strength value of 1.5. The mapping and strength values may be stored in a database for easy access when developing the character models.

Potential sources of the terms that describe the character include the character's official webpage, Wikipedia pages for the character and show the character appears in, fan pages, social networking pages, social networking chatter (e.g., tweets from Twitter, Facebook comments, etc.), and other Internet sources.

Aggregating users' responses to a character may also be used to develop character models. For example, responses related to a character's attribute may be determined as "positive" or "negative" and used to increase or decrease the attribute value in the character model accordingly. Users' responses may be aggregated from across the Internet, such as social networks, webpages, emails, and the like. Additionally, character models may be based on explicit thumbs up and down by users, clustering user preferences for characters with other web pages the user likes and/or Internet groups of which the user is a part, the expertise of web pages and Internet groups that mention the character, Nielsen ratings for a show, awards, trade magazines, expert commentary, and editorial reviews.

Survey methodologies may be used to develop character models. A survey can be conducted to assess a population's opinion about a character's attributes. The surveys may ask several questions to get the underlying value for a more subtle attribute. For example, to assess a "social competence" attribute, respondents may be asked if the character has a lot of friends, if the character is familiar with popular culture, and if the character is able to adapt to both formal and informal situations.

These surveys may be, for example, full-length surveys looking at each respondent's overall reaction to a character or microsurveys asking respondents single, discrete questions using services such as Mechanical Turk.

Expert validation may be used to develop character models. Certain attributes, such as "agency" or "moral character," may benefit from input from experts in various fields including media studies and psychology. For these attributes, survey methodologies may be combined to populate the majority of the database, with expert validation on a randomly selected subset to ensure methodologies used to populate the majority of the database are in line with best practices from those fields.

User feedback may be used to develop character models. Users' responses to characters may be aggregated and used to feed into the database of character models. For example, when a consumer endorses via social networks, shares with friends, or watches a given character in a media content, the consumer is prompted to provide feedback on why they liked, shared, or viewed that particular character or media content.

Character Preference Function

Thus far, the described techniques for determining distance have not differentiated between the importance of the various character attributes as viewed from the perspective of a consumer. To be more precise, we have defined a single distance function applicable to any character. These search techniques can be further refined by taking into account whether a consumer cares more about similarity along some dimensions of the character model than other dimensions of the character model. This preference information about the consumer is captured in a character preference function and is used for determining preferences and distances between characters.

Different consumers may have different character preference functions, which are each based on the associated consumer's preferences. For example, Jessica, a television viewer, may care only about the gender of characters and the attractiveness of characters. In particular, she likes attractive characters and female characters. These preferences may be gathered directly or indirectly. For example, a user may directly input their preferences or the user's preferences may be learned by identifying which characters the user likes. As alluded to above, these user-specific preferences can be encoded in a set of "weights" $\beta_i$ for each attribute. Here, Jessica's character preference function is represented as:

$$f(\text{jessica}) = \beta_1 \cdot c_1 + 0 \cdot c_2 + \beta_3 \cdot c_3 + 0 \cdot c_4$$

where $\beta_1$, $\beta_3$ are both greater than 0. In this example, the coefficients on the second and fourth attributes (i.e., coefficient to $c_2$ scientist attribute and coefficient to $c_4$ friendliness attribute) are 0 because Jessica does not care about them, and the coefficients on the attributes she likes (i.e., $\beta_1$ coefficient to $c_1$ gender attribute and $\beta_3$ coefficient to $c_3$ attractiveness attribute) are positive. If Jessica preferred male characters rather than female characters, the $\beta_1$ coefficient for the gender attribute would be negative. These coefficients may be referred to as the consumer's preference coefficients and they correlate to all or some of the values of the character models. The preference coefficients may be integers or real numbers. Negative preferences (e.g., a dislike for an attribute) may be incorporated into a preference function as well. One of ordinary skill in the art will appreciate that coefficients are a type of parameter, and that more generalized parameters for other functional forms may be used instead of coefficients.

In another example, George, another television viewer, is interested only in the scientist dimension of characters. George likes scientists regardless of their other attributes. George's character preference function is significantly simpler than Jessica's character preference function because George only cares about one dimension—the scientist dimension. Thus, the coefficients, or weights, on all the other dimensions are 0. George's character preference function is reduced to:

$$f(george) = \beta_2 \cdot c_2$$

where $\beta_2$ is greater than 0. Jessica's and George's preferences are captured in their character preference functions. These character preference functions can be used to recommend characters and to determine distances between characters, with both recommendations and distances being individualized for the consumer associated with the character preference function.

As discussed above, the system can recommend characters based on the character preference function. Using Jessica's character preference function and the character models illustrated in FIG. 1, the system will rank Penny 106 and Bernadette 112 highly. This system will recommend Penny 106 and Bernadette 112 to Jessica because Penny 106 and Bernadette 112 are ranked highly based on a combination of Penny's character model 120, Bernadette's character model 126, and Jessica's character preference function. The recommendation values that are translated into rankings can be calculated using the consumer's character preference function:

$$f(consumer, character) = \vec{\beta} \cdot \vec{c}$$

where $\beta$ represents the preference coefficients of the consumer along n attributes and c represents a character's attributes, such as from a character model, along the same n attributes. This character preference function may be computed multiple times for different characters to determine the distance between characters for the particular consumer.

Based on George's character preference function and the character models illustrated in FIG. 1, the system will rank all characters that are scientists equally highly and recommend them to George. Similar equations can be used to calculate recommendation values for George.

The character preference function may also represent different or additional information than information capturing what the consumer likes or dislikes. For example, Jessica's character preference function may represent what Jessica likes, what type of characters or content Jessica has viewed in the past, what character or content Jessica has provided feedback on, whether the feedback has been positive/negative, a combination of one or more of these elements, or the like.

The system can also determine distances between characters by using the character preference functions in combination with the character models. For example, based on Jessica's character preference function described above and the character models illustrated in FIG. 1, the system will identify Penny and Bernadette as having a relatively low distance because Penny and Bernadette share the same gender (female) and attractiveness (attractive). Recall that gender and attractiveness are the two dimensions that are relevant in Jessica's character preference function. If gender and attractiveness are the only dimensions relevant to Jessica's character preference function, the distance between Penny and Bernadette is 0. Similarly, the system will determine that Howard and Penny have a relatively high distance because Howard and Penny differ in both gender and attractiveness. In particular, Howard is a unattractive and male while Penny is attractive and female. Again, recall that Jessica's character preference function emphasizes the gender and attractiveness dimensions. Thus, Howard and Penny may be viewed by the system as opposites with respect to Jessica's character preference function because Howard and Penny differ in both gender and attractiveness.

Second Order Terms for Character Preference Functions

In some instances, the distances between characters based on character models and character preference functions may be computed using second order or higher terms. For example, a consumer may like male scientists but may dislike female scientists. Similarly, a consumer may like attractive females as well as attractive scientists. To distinguish among these combinations, second order or higher preferences need to be captured in the character preference function. With regard to second order terms, note that, for example, a preference for an attractive female character (second order) is different than a preference for both attractive characters (first order) and female characters (first order).

In one example, a consumer named Brian likes female scientist characters (second order), and attractive characters (first order), and friendly characters (first order). Note that a preference for a female scientist is different than a preference for female characters and characters that are scientists. Brian's character preference is:

$$f(c) = \beta_1 \cdot c_1 + \beta_2 \cdot c_2 + \beta_3 \cdot c_3 + \beta_4 \cdot c_4 + \gamma_{1,2} \cdot c_1 \cdot c_2 + \gamma_{3,4} \cdot c_3 \cdot c_4$$

where $\beta_1$, $\beta_1$, $\beta_1$, $\beta_1$, $\gamma_{1,2}$, $\gamma_{3,4} > 0$. The second order terms captured by the positive coefficients $\gamma_{1,2}$, $\gamma_{3,4}$ provide more precise metrics for character recommendations and distances between characters with relation to Brian's preferences. Brian's character preference is described below with annotations for clarity:

$$f(c) = \beta_1 \cdot c_1[gender] + \beta_2 \cdot c_2[scientist] + \beta_3 \cdot c_3[attractiveness] + \beta_4 \cdot c_4[friendliness] + \gamma_{1,2} \cdot c_1[gender] \cdot c_2[scientist] + \gamma_{3,4} \cdot c_3[attractiveness] \cdot c_4[friendliness]$$

This second order of preference is captured in Brian's character preference function to provide more precise metrics for character recommendations and distances between characters with relation to Brian's preferences.

In particular, Brian's character preference function illustrates that Brian likes female scientists. This is stored in Brian's character preference function using the vector of weights $\vec{\beta}$ and the matrix of weights for the second order terms $\gamma$. Thus, when computing recommendations and distances using Brian's character preference function, the system can take Brian's second order preferences into consideration. In this example with relation to Brian's character preference function, the distance d between a first character A and a second character B is determined as follows:

$$d(A, B) = \beta \cdot \text{abs}(A - B)' + \text{abs}(A - B)' \cdot \frac{\gamma}{2} \cdot \text{abs}(A - B)$$

One of ordinary skill will readily appreciate that additional techniques may be used to represent the character preference functions.

Preference Models

A preference model may be developed by using data from multiple character preferences function in conjunction with known attributes about the users associated with the character preference functions. A database of users is aggregated that associates users with one or more attributes and their character preference function. Using this database, a preference model can be determined for a person or a group of people.

For example, assume that 75% of users who are both female and have a degree in a science, technology, engineering, or mathematics (STEM) field have user profiles that indicate they enjoy watching female scientists in media. This is a strong indicator that other females with a degree in a STEM field will also enjoy watching female scientists in media. Thus, when a new user joins the system who provides their gender as female and education as related to STEM, the system can predict that the new user will enjoy watching female scientists without requiring direct feedback from the new user about her viewing preferences. Accordingly, the system can recommend media using the techniques described above by using the prediction that the new user enjoys female scientists.

Similarly, multiple character preference functions can be used to predict what characteristics a particular demographic will enjoy. For example, if a group viewing is being conducted (such as in a movie theater), statistics about the attributes of the group members can be gathered in advance. The statistics about the group's attributes can be used to identify the types of characters the group is likely to enjoy. Using the techniques described above, media can be identified that the group is likely to enjoy. The preference model can also be extended beyond media to any type of character.

Beyond relying on demographic information, user specific preference functions can be calculated in a number of different ways: 1) Direct elicitation: asking users about their preferences for specific characters, character attributes, or combinations of attributes. 2) Inference from favorite characters and shows. For example, given a set of characters that the user likes and a set that the user does not like, one could estimate the preference weights by assuming that the probability that the user "liked" a character was a sigmoid function $$\left(\text{e.g., } \frac{1}{1 + \exp(-x)}\right)$$

of the user's character preference function. By finding the coefficients $\beta$, $\gamma$, that maximized the joint probability that the user likes and did not like those sets of characters, the system can calculate the user's character preference function. 3) Inference from physiological recording: In the absence of direct reporting from the consumer about their character preferences, eye-tracking, facial responses, posture mapping or any number of other types of physiological recording may be used to detect which characters demand the most attention from a consumer, and whether that attention is positive or negative. Given these physiological responses to characters, a preference model could be inferred following a similar method as that described for 2). The preference model can also be extended beyond media to any type of character.

Content Recommendation

Information about characters can be used to determine ratings and recommendations of media content and to determine distances between media content. For example, a consumer who likes attractive scientists would likely enjoy a show that employs multiple characters that are attractive scientists. The same consumer would likely not enjoy a show that primarily employs characters that are unattractive non-scientists.

Media content may be rated using a salience weighted sum of a consumer's preferences for all or some characters included in the media content. The relative salience of the character in media content can be determined multiple ways.

One method to determine salience is to base the salience on the percentage of screen time the character gets in relation to the total screen time of all characters. For a simple example, consider a comedy show that includes a doctor, an engineer, and an attorney as characters. The doctor is on screen for a total of 1,100 seconds, the engineer is on screen for a total of 1,500 seconds, and the attorney is on screen for only 600 seconds. Using this first method, the salience S of a character (Char) in relation to all the characters (AllChars) can be computed as:

$$S(Char) = \frac{ScreenTime(Char)}{ScreenTime(AllChars)}$$

In this particular example of the doctor, engineer, and attorney, the salience for each character is computed as follows:

$$S(\text{doctor}) = \frac{1{,}100}{1{,}100 + 1{,}500 + 600} = 0.34375$$

$$S(\text{engineer}) = \frac{1{,}500}{1{,}100 + 1{,}500 + 600} = 0.46875$$

$$S(\text{attorney}) = \frac{600}{1{,}100 + 1{,}500 + 600} = 0.1875$$

Another method to determine salience is to base the salience on the number of reactions detected in social media relating to a character. For example, Twitter, Facebook, Google+, Instagram, and other social networking websites may be monitored to track the number of times a character's name is mentioned, a character's image is published, a character's reference is acknowledged (e.g., liking a character's fan page on Facebook), and the like. Using this method, the relative salience of a character can be determined based on the number of times a character in a media content elicits reactions versus the number of times all characters in the media content elicit reactions. For example, this computation can be performed as:

$$S(Char) = \frac{NumberOfReactions(Char)}{NumberOfReactions(AllChars)}$$

Yet another method to determine salience is to consider the character's prevalence on the Internet in general. The prevalence can be determined a number of ways. On method is to identify the number of search results returned from a reliable search engine for the name of a character. For example, searching Google for "Bill Clinton" returns about 40,400,000 results. Searching Google for "George W. Bush" returns about 95,800,000 results. Thus, the character George W. Bush is more salient with respect to the character Bill Clinton. Using this method, the prevalence of the character on the Internet can be used to calculate salience in a similar manner as the number of on-screen minutes for characters, as described above.

Another method for gathering either general or user specific character salience is to utilize physiological responses to characters. For example, eye-tracking data may be used to assess that on average viewers spend more time looking at Sheldon, Leonard, and Penny than any other characters on The Big Bang Theory, giving these characters particularly high salience over the population. Alternatively, or in addition, the system may compute that a specific user, Jessica, spent the majority of her time looking at Penny, indicating that Penny was the most salient character to her. An additional way to gather user specific salience is by analyzing a user's behavior on social media in response to watching a show.

One of ordinary skill in the art will readily recognize that not all characters of the media content must be considered for the salience techniques described above. For example, a minimum threshold value may be set so that insignificant characters (e.g., those who receive very little screen time, those who elicit very few social media reactions, those who have low prevalence on the Internet, and the like) are not considered in the salience calculations. Alternatively, or in addition, a maximum threshold may also be set so that characters in a particular media content that are very popular do not overshadow other characters in the salience calculations.

The consumers' preferences, the characters' attributes, and the characters' salience are considered for calculating a rating for a media content. This rating can then be used to rank various media content and recommend media content to consumers. Consider a consumer named Steven who is interested in viewing more females in television shows. Steven has indicated, or it has been inferred from his revealed preferences, that he would particularly like to see female scientists and that he prefers scientists in the television shows that he watches to be attractive. The system computes a character preference function for each character with relation to Steven's preferences to account for these attributes. The character preference function represents a consumer's rating of the character. To compute the character preference functions, the salience of the characters is used. In this case, the salience for each character is pre-computed and identified in Table 1, below, with relation to the characters identified in FIG. 1. The salience values in this case were calculated based on screen time for each character using a particular episode of the show The Big Bang Theory. As discussed above, other methods may be used. Additionally, the calculation may be based on a single scene of a media content, a single episode of a media content, a single season of a media content, or all the available shows of a media content.

TABLE 1

Exemplary Salience Values

| Character | Salience |
|---|---|
| Sheldon | 0.2 |
| Leonard | 0.2 |
| Penny | 0.2 |
| Howard | 0.15 |
| Rajesh | 0.15 |
| Bernadette | 0.05 |
| Amy | 0.05 |

Let $c \in \mathbb{R}^n$ represent the attribute values for a character char on N distinct dimensions. The following character preference function is used to calculate a rating for each character:

$$f(Char) = \sum_{i=1}^{N} \beta_i \cdot c_i + \sum_{i,j} \beta_{i,j} \cdot c_i \cdot c_j$$

Additionally, higher order terms may also be included. For example, the character preference function can be extended to:

$$f(char) = \sum_{i=1}^{N} \beta_i \cdot c_i + \sum_{i,j} \beta_{i,j} \cdot c_i \cdot c_j + \sum_{i,j,k} \beta_{i,j,k} \cdot c_i \cdot c_j \cdot c_k + \text{higher order terms}$$

The coefficients $\beta$ are determined separately for each user to allow for personalized recommendations. For the preferences indicated by Steven, the following character preference function is used to calculate a rating for each character:

$f(Char)=$Gender+(Gender*Scientist)+
(Attractiveness*Scientist)

Using the character models of FIG. 1 and Steven's character preference function, the ratings of the characters illustrated in FIG. 1 are computed for Steven as follows:

$f(Sheldon)=-1+(-1\times1)+(-1\times1)=-3$ $f(Leonard)=-1+(-1\times1)+(0\times1)=-2$ $f(Penny)=1+(1\times-1)+(1\times-1)=-1$ $f(Howard)=-1+(-1\times1)+(-1\times1)=-3$ $f(Rajesh)=-1+(-1\times1)+(0\times1)=-1$ $f(Bernadette)=1+(1\times1)+(1\times1)=3$ $f(Amy)=1+(1\times1)+(-1\times1)=1$ These calculated character ratings are valid for the characters identified for a particular episode of The Big Bang Theory. The calculated character ratings and their corresponding salience values can be used to calculate a show rating for that particular episode of The Big Bang Theory. The calculation of the show rating is performed by summing the product of each character's salience and rating. Using a salience vector $\vec{S}$ and characters rating vector $\vec{R}$, an episode rating R is calculated as:

$R(\text{Show\_Episode}X) = \vec{S} \cdot \vec{R}$

In this particular example of Steven with relation to the characters illustrated in FIG. 1, the rating R of The Big Bang Theory (TBBT) episode is calculated as:

$$R(TBBT)=(0.2\times-3)+(0.2\times-2)+(0.2\times-1)+(0.15\times-3)+(0.15\times-1)+(0.05\times3)+(0.05\times1)=-1.6$$

Thus, the rating for this particular episode of The Big Bang Theory for the consumer Steven is −1.6. For recommendations, this rating value is compared to similarly calculated rating values for other shows. Rankings are prepared based on the rating values. For example, the media content with the highest rating values will be ranked highest while the media content with the lowest rating values will be ranked the lowest. The highest ranked shows are recommended to the consumer, as these highly ranked shows represent the shows that the consumer is likely to be interested in or is likely to enjoy. One of ordinary skill in the art will appreciate that coefficients are a type of parameter, and that more generalized parameters for other functional forms may be used instead of coefficients.

System Integration

The techniques discussed above may be used separately or combined to produce a powerful system for discovering and organizing characters and media content based on consumer preferences.

FIG. 2 illustrates an exemplary block diagram for a combined technique to perform discovery and organization of characters and media content. At block 202, the system accesses feedback from users. This feedback is used to determine the user's preferences and develop a character preference function. The feedback may be explicit, such as through direct questions. The feedback may be implicit, such as by analyzing webpages the user has clicked on, viewed, commented on, shared, and the like. The feedback may be physiological, such as by eye tracking, galvanic skin response, electroencephalography, facial expression tracking, posture mapping, and the like. The character preference function is stored in a database and associated with the user from whom the feedback was received.

At block 204, attributes to be included in a character model are determined. Multiple examples are described. Physical attributes of the characters may be tracked, such as gender, age, and the like. Personality attributes may be tracked, such as kindness, humor, cruelty, and the like. Social attributes or roles may be tracked, such as relationship (parent/grandparent), community leader, occupation, and the like. Additional attributes may be tracked, such as race, socioeconomic class, and the like.

At block 206, data relevant to the characters and their attributes are extracted from data sources. The data may be extracted from the text of webpages, such as Wikipedia, fan sites, social networks, such as Facebook and Twitter, surveys, expert validation, and other sources.

At block 208, character decomposition is performed. The data extracted from the data sources is used to assign values for each attribute identified in block 204 for the characters in a character model database. For example, the various techniques described above may be used to assign values for each character's character model.

At block 210, the user preference model and the character model are accessed to determine user preferences across the character attributes of the character model. The preference data is used to discover new characters or new shows that the user may like. The preference data may also be used to organize characters or shows based on the user's preferences, such as identifying which characters are similar or dissimilar. As a result, the system is able to efficiently and reliably recommend characters and media content to the user.

Figure 3:
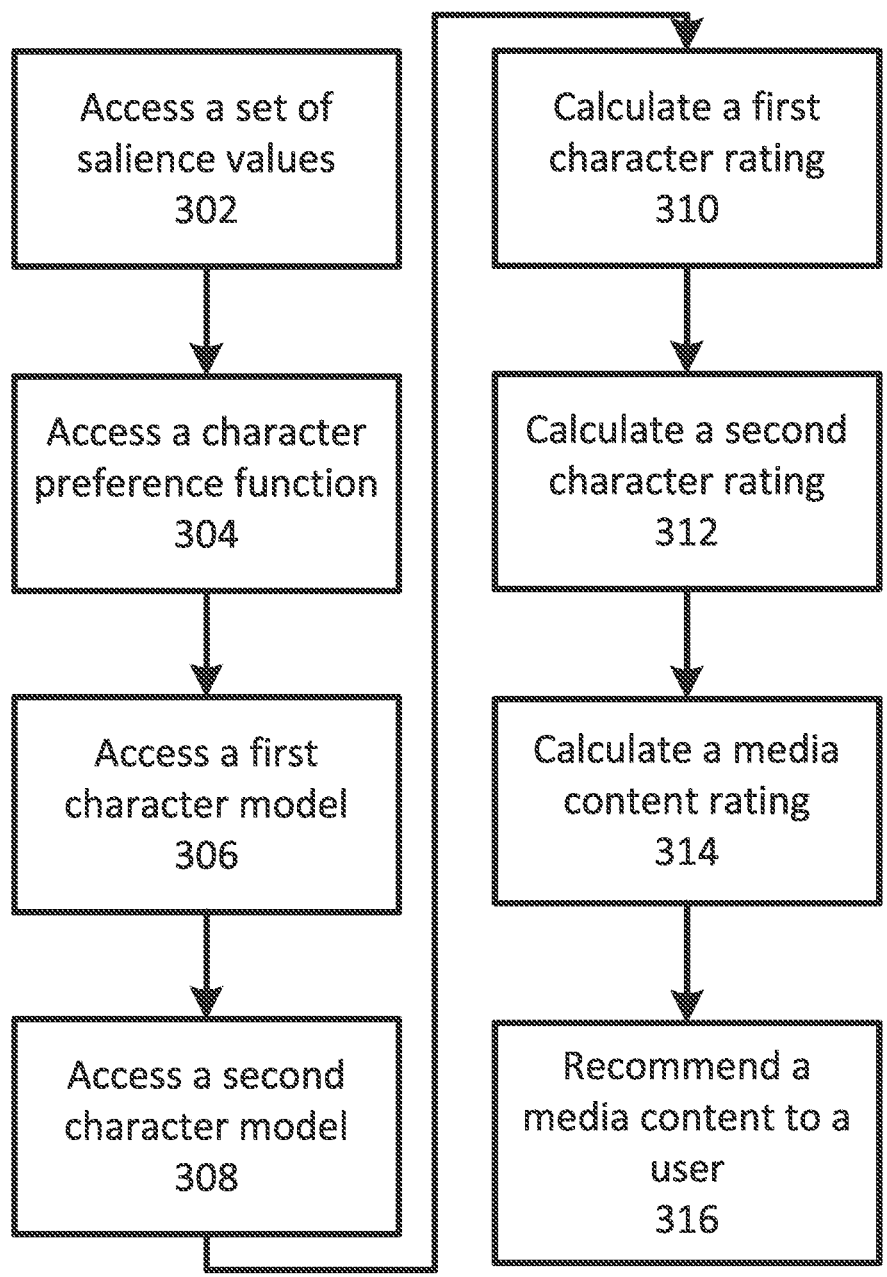
FIG. 3 illustrates an exemplary process for recommending media.

FIG. 3 illustrates an exemplary process for recommending media. At block 302, a recommendation system accesses a set of salience values. The salience values of the set are associated with a media content. Each salience value is associated with one character from the media content. The salience values are indicative of how important the characters are to the feel or tone of the show. The higher the salience value of a character, the more important the character. At block 304, the system accesses a character preference function. The character preference function is associated with a user of the system. The character preference function comprises information that identifies a plurality of preference coefficients. Each of the preference coefficients in the plurality of preference coefficients is associated with at least one attribute of interest, selected from a plurality of attributes. For example, the preference function may indicate that the user has a preference coefficient of 1 associated with a "gender" attribute of interest and a preference coefficient of 1 associated with a "scientist" attribute of interest.

At block 306, the system accesses a first character model. The first character model is associated with a first character from the media content. The first character model includes information that identifies a first set of attribute values. The attribute values are matched with attributes of the first character. The attributes may be the same as the attributes for which the character preference function includes preference coefficients. The first character is also associated with a first salience value from the set of salience values. The first salience value will be used to determine how much influence the first character has when computing a rating of the media content.

At block 308, the system accesses a second character model. The second character model is associated with a second character from the media content. The second character model includes information that identifies a second set of attribute values. The attribute values are matched with attributes of the second character. The attributes may be the same as the attributes for which the character preference function includes preference coefficients. The second character is also associated with a second salience value from the set of salience values. The second salience value will be used to determine how much influence the second character has when computing a rating of the media content.

At block 310, the system calculates a first character rating of the first character by performing a summation of the products of the plurality of preference coefficients with the first set of attribute values. For example, the system will multiply the preference coefficient for gender with the first character's attribute value for gender. The system will also multiply the preference coefficient for scientist with the first character's attribute value for scientist. These two products for gender and scientist are then added together. The first character rating of the first character is based on this summation.

At block 312, the system similarly calculates a second character rating of the second character by performing a summation of the products of the plurality of preference coefficients with the second set of attribute values. For example, the system will multiply the preference coefficient for gender with the second character's attribute value for gender. The system will also multiply the preference coefficient for scientist with the second character's attribute value for scientist. These two products for gender and scientist are then added together. The second character rating of the second character is based on this summation.

At block 314, the system calculates a media content rating. The media content rating is calculated based on the first salience value, second salience value, the first character rating, and the second character rating. The salience values are used to weight the influence that each character rating has on the media content rating.

At block 316, the system recommends the media content to the user based on the media content rating. The recommendation may be simply providing the title of the media content, providing a link to the media content, displaying the media content, and the like. For example, the media content may be an advertisement that the system has determined the user may enjoy, connect with, or sympathize with. In other examples, the media content may be a written article, a game, a mobile app or computer application, and the like.

In general, the blocks of FIG. 3 may be performed in various orders, and in some instances may be performed partially or fully in parallel. Additionally, not all blocks must be performed. For example, the set of salience values need not necessarily be accessed before accessing the first and second character models.

Figure 4:
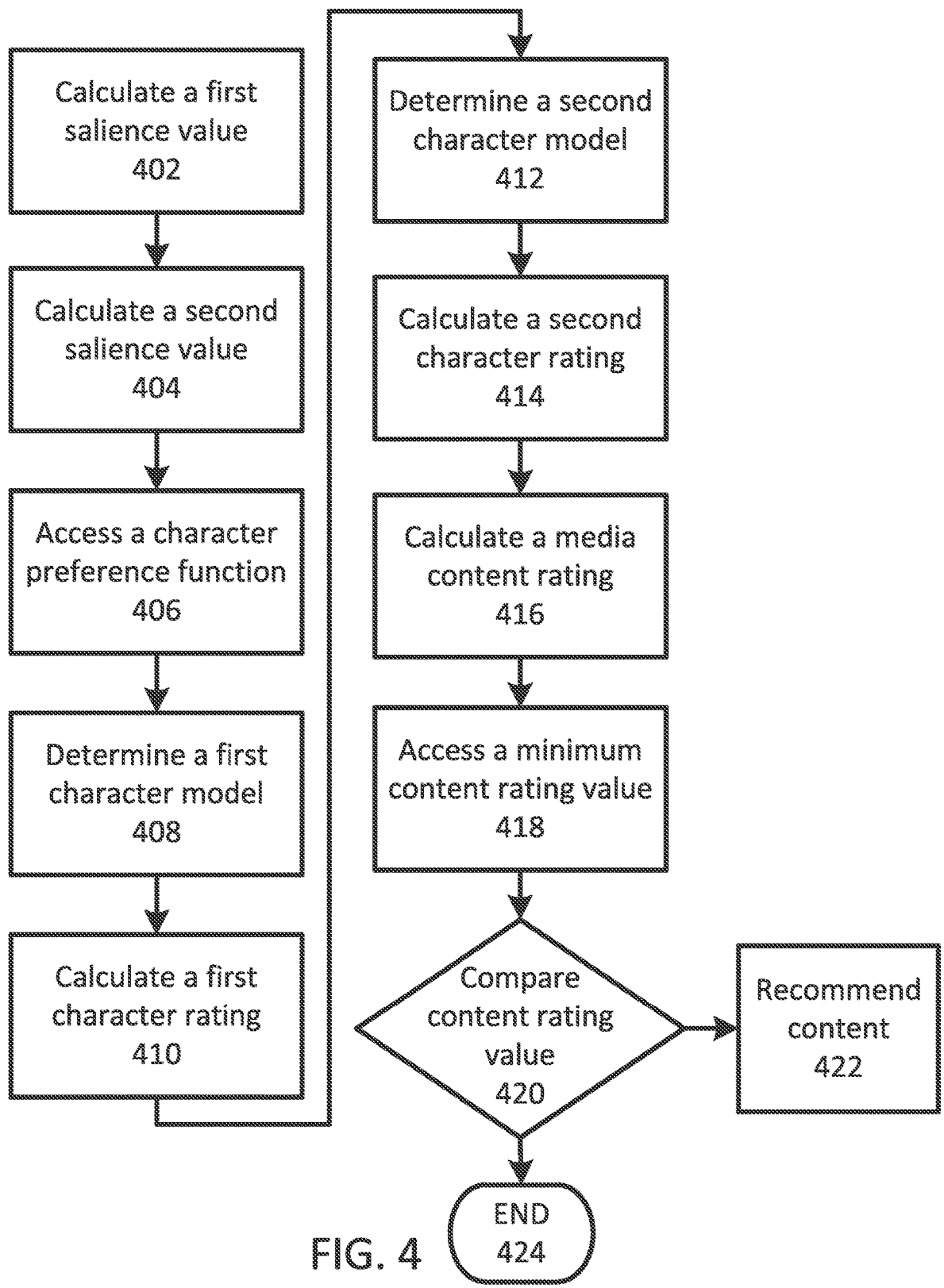
FIG. 4 illustrates another exemplary process for recommending media.

FIG. 4 illustrates an exemplary process for recommending media. At block 402, a recommendation system calculates a first salience value of a set of salience values. The first salience value is associated with a first character of a plurality of characters of a media content. The first salience value is calculated based on the on-screen time of the first character in the media content. More specifically, the system determines or accesses a total on-screen time value. For example, the total on-screen time value may be sum of the time all (or select) characters of the media content spend on screen. The system also determines or accesses the on-screen time for the first character. The first salience value is calculated by dividing the on-screen time of the first character by the total on-screen time value.

At block 404, the system calculates a second salience value of the set of salience values. The second salience value is associated with a second character of the plurality of characters of the media content. The second salience value is calculated based on the on-screen time of the second character in the media content. More specifically, the system determines or accesses the on-screen time for the second character. The second salience value is calculated by dividing the on-screen time of the second character by the total on-screen time value.

The salience values of the set are associated with the media content. Each salience value is associated with one character from the media content. The salience values are indicative of how important the characters are to the feel or tone of the show. The higher the salience value of a character, the more important the character.

At block 406, the system accesses a character preference function. The character preference function is associated with a user of the system. The character preference function comprises information that identifies a plurality of preference coefficients. Each of the preference coefficients in the plurality of preference coefficients is associated with at least one attribute of interest, selected from a plurality of attributes. For example, the preference function may indicate that the user has a preference coefficient of 0.8 associated with "female scientist" attributes of interest, a preference coefficient of 1 associated with a "female" attribute of interest, and a preference coefficient of 1 associated with a "scientist" attribute of interest.

This character preference function is a second order function. The second order function has first order terms and second order terms. The character preference function associates at least one of the plurality of preference coefficients with two or more attributes of interest of the plurality of attributes. In this example, the character preference function associates the preference coefficient of 0.8 with the attributes of interest of "female scientist."

At block 408, the system determines a first character model. The first character model is associated with the first character from the media content. The first character model includes information that identifies a first set of attribute values. The attribute values are matched with attributes of the first character. The attributes associated with the attribute values may be the same as the attributes for which the character preference function includes preference coefficients.

The first character model is determined in part by identifying textual content associated with the first character in electronic sources, such as websites, electronic books, electronic newspapers and magazines, social media, and the like. The system aggregates a plurality of attribute terms associated with the first character from the textual content. For example, the system may aggregate terms such as "cute," "smart," "social," and the like. The system maps at least some of the plurality of attribute terms to at least some of the plurality of attributes. This mapping allows a relationship to be identified between the aggregated terms (such as "cute") and the attributes of the character that are tracked (such as "attractive"). The system updates the attribute values of the first character based on the plurality of attribute terms.

At block 410, the system calculates a first character rating of the first character. The system sums the first order terms and the second order terms of the character preference function in conjunction with the first character model. For the first order terms, the system calculates the products of the plurality of preference coefficients that are first order with the first set of attribute values. In this example, the system multiplies the preference coefficient of 1 associated with "scientist" with the first character model's attribute value for "scientist." Similarly, the system multiplies the preference coefficient of 1 associated with "female" with the first character model's attribute value for "female." For the second order terms, the system determines the product of the at least one of the plurality of preference coefficients with each attribute value of the first set of attribute values of the two or more attributes of interest of the plurality of attributes. In order words, the system calculates the products of the plurality of preference coefficients that are second order with the first set of attribute values. In this example, the system multiplies the preference coefficient of 0.8 associated with "female scientist" with the first character model's attribute value for "female" and with the first character model's attribute value for "scientist." The first order terms and second order terms are then summed to produce the first character rating.

Each of the attribute terms may be associated with a strength value. This is helpful for distinguishing between strong terms and less strong terms. For example, a strong term may indicate that a character is "definitely friendly." A less strong term may indicate that the character is "sometimes friendly." The system then updates the attribute values of the first character based on the corresponding strength values of the attribute terms. In this example, "definitely friendly" may be associated with a 1.5 for the friendliness attribute, while "sometimes friendly" is associated with a 0.75 for the friendliness attribute. In one example, the system stores the updated attribute values of the first character in a database as a vector, the vector associated with the first character.

At block 412, the system determines a second character model. The second character model is associated with the second character from the media content. The second character model includes information that identifies a second set of attribute values. The attribute values are matched with attributes of the second character. The attributes associated with the attribute values may be the same as the attributes for which the character preference function includes preference coefficients.

The second character model is determined in a similar fashion as described above with respect to the first character model. The second character model is determined in part by identifying textual content associated with the second character in electronic sources. The system aggregates a plurality of attribute terms associated with the second character from the textual content. The system maps at least some of the plurality of attribute terms to at least some of the plurality of attributes. The system updates the attribute values of the first character based on the plurality of attribute terms and the corresponding strength values of the attribute terms. In one example, the system stores the updated attribute values of the second character in a database as a vector, the vector associated with the second character.

At block 414, the system calculates a second character rating of the second character. The second character rating is computed in a similar fashion as the first character rating. However, the second character model and second character attribute values are used. At block 416, the system calculates a second character rating of the second character in a similar fashion as calculated for the first character.

At block 416, the system calculates a media content rating. The media content rating is calculated based on the first salience value, second salience value, the first character rating, and the second character rating. The salience values are used to weight the influence that each character rating has on the media content rating.

At block 418, the system accesses a minimum content rating value. At block 420, the system compares the media content rating to the minimum content rating value. The media content rating is numerical and the minimum content rating value is numerical. If the media content rating is greater than the minimum content rating value, the system moves to block 422. Otherwise, the process ends at block 424.

At block 422, the system recommends the media content to the user based on the media content rating. The recommendation may be simply providing the title of the media content, providing a link to the media content, displaying the media content, and the like. For example, the media content may be an advertisement that the system has determined the user may enjoy, connect with, or sympathize with. In other examples, the media content may be a written article, a game, a mobile app or computer application, and the like.

In general, the blocks of FIG. 4 may be performed in various orders, and in some instances may be performed partially or fully in parallel. Additionally, not all blocks must be performed. For example, the first character rating and the second character rating may be computed in parallel.

Figure 5:
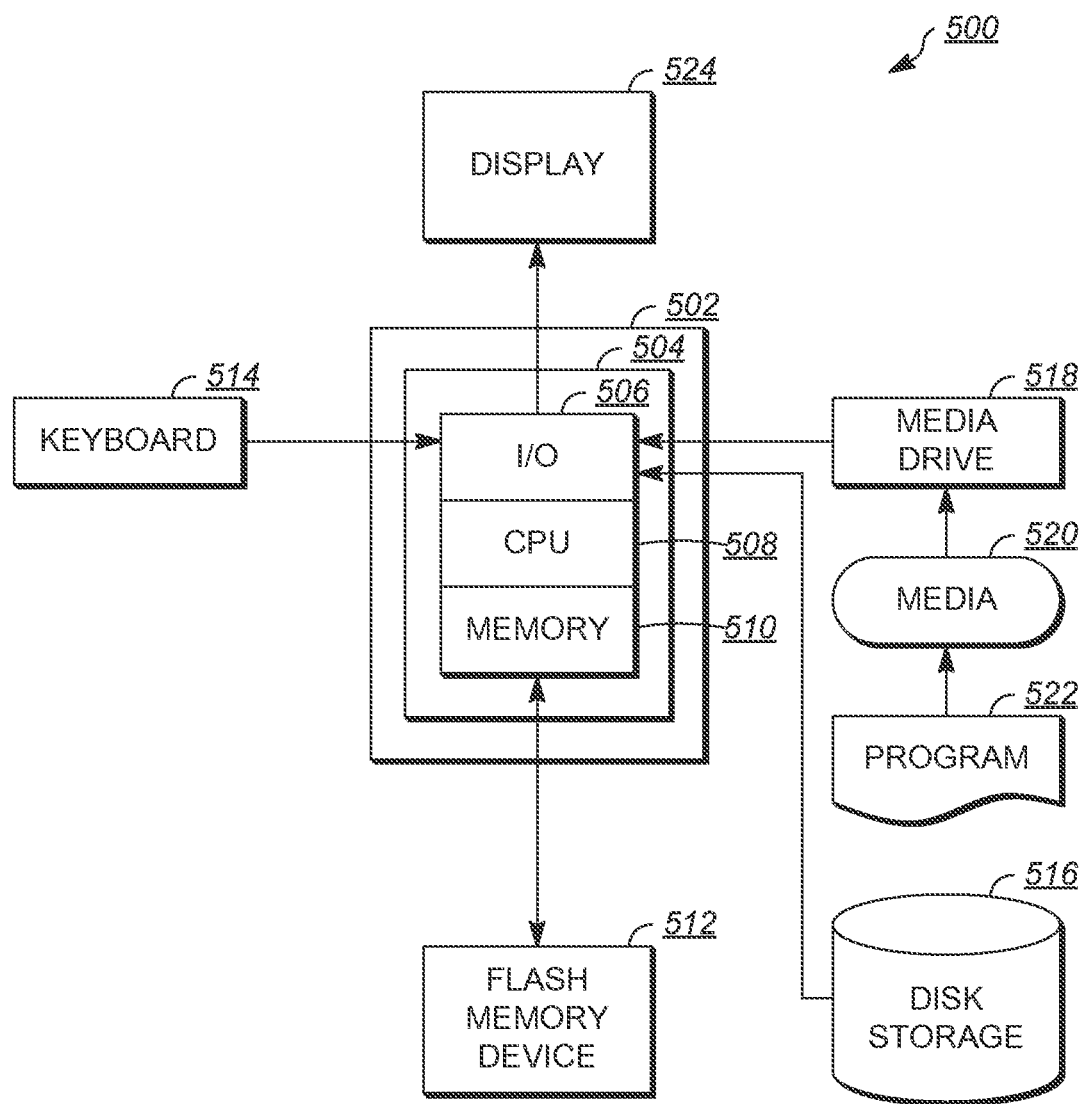
FIG. 5 illustrates an exemplary computing system.

While FIG. 4 and FIG. 5 were described with respect to recommending media to a user, the techniques described above may be applied to various other systems. In one example, the system may be used to provide an interface to filter and curate information based on character decomposition. More specifically, the system may be used to: alter rankings for a list of items, control viewing abilities of a television or other viewing system, suggest content for purchasing, recommend video games or prevent access to video games, filter content to prevent children from viewing content with a negative message, characterize what a child is watching, or find the intersection between the desires of a parent and the viewing preferences of a child.

In another example, the system may provide information to content producers to understand audience preferences based on character decomposition. More specifically, the system may be used to: aggregate insights to content producers on what types of characters to create based on aggregated user demand or preferences, or identify characteristics/attributes of a character most likely to resonate with a particular target user group to enable mapping of a character/celebrity with a target audience.

In another example, the system may provide complementary, simultaneous, character-based browsing and information discovery. More specifically, the system may be used to: provide a second screen experience, enhance viewing experience of media with simultaneous recommendations, and provide in-play ads based on characters appearing in the show.

In yet another example, the system may be used for user-generated character creation. Users can create their own characters based on what features the user likes. This allows for the collection of user-generated signals and data that informs the development of characters based on attributes the user (or users) value most. This also generates insights on user preferences and latent demand for specific types of characters as well as explicitly informing and directing new character development for content providers.

FIG. 5 depicts an exemplary computing system 500 configured to perform any one of the above-described processes. In this context, computing system 500 may include, for example, a processor, memory, storage, and input/output devices (e.g., monitor, keyboard, touch screen, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform the above-described processes. The main system 502 includes a motherboard 504 having an input/output ("I/O") section 506, one or more central processing units ("CPU") 508, and a memory section 510, which may have a flash memory device 512 related to it. The I/O section 506 is connected to a display 524, a keyboard 514, a disk storage unit 516, and a media drive unit 518. The media drive unit 518 can read/write a computer-readable medium 520, which can contain programs 522 and/or data. The I/O section 506 may also connect to cloud storage using, for example, cellular data communications or wireless local area network communications.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Perl, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-implemented method comprising:
   accessing, by a computing system, character preference data for a user, wherein the character preference data identifies a first character that the user likes and a second character that the user dislikes, and wherein the first character and the second character appear in media content;
   accessing, by the computing system, attribute values of the first character that the user likes;
   accessing, by the computing system, attribute values of the second character that the user dislikes;
   determining, by the computing system based on the attribute values of the first character and the attribute values of the second character, a character preference function for the user, wherein the character preference function comprises information identifying a plurality of preference coefficients, with each preference coefficient of the plurality of preference coefficients associated with a respective attribute of a plurality of attributes; and
   using, by the computing system, the character preference function for the user to select one or more media contents from among a plurality of media contents, wherein using the character preference function for the user to select one or more media contents from among a plurality of media contents comprises determining a character rating for a character in a given media content from among the plurality of media contents based on the character preference function for the user and a character model for the character and recommending, based on the character rating, the given media content to the user.

2. The computer-implemented method of claim 1, wherein determining the character preference function for the user comprises determining that the plurality of preference coefficients maximize a joint probability that the user likes the first character and dislikes the second character.

3. The computer-implemented method of claim 1, further comprising:
   prompting the user to identify characters that the user likes; and
   based on the prompting, receiving the character preference data identifying the first character that the user likes.

4. The computer-implemented method of claim 1, further comprising:
   accessing physiological recording data for the user; and
   determining the first character that the user likes using the physiological recording data for the user.

5. The computer-implemented method of claim 4, wherein the physiological recording data comprises eye-tracking information or facial response information.

6. The computer-implemented method of claim 4, wherein the physiological recording data is indicative of reactions of the user to characters as the user consumes the media content.

7. The computer-implemented method of claim 1, wherein the character model for the character comprises a multidimensional representation of the plurality of attributes.

8. The computer-implemented method of claim 1, further comprising determining a media content rating for the given media content based on the character rating for the character.

9. The computer-implemented method of claim 8, wherein the recommending the given media content to the user is further based on the media content rating.

10. The computer-implemented method of claim 1, further comprising rating a likelihood that the user will enjoy the given media content based on the character preference function for the user and the character model.

11. The computer-implemented method of claim 1, wherein accessing attribute values of the first character that the user likes comprises:
    accessing a character model for the first character that the user likes; and
    accessing, from the character model for the first character that the user likes, the attribute values of the first character that the user likes.

12. A non-transitory computer-readable medium having stored thereon program instructions that upon execution by a processor, cause performance of a set of acts comprising:
    accessing character preference data for a user, wherein the character preference data identifies a first character that the user likes and a second character that the user dislikes, and wherein the first character and the second character appear in media content;
    accessing attribute values of the first character that the user likes;
    accessing attribute values of the second character that the user dislikes;
    determining, based on the attribute values of the first character and the attribute values of the second character, a character preference function for the user, wherein the character preference function comprises information identifying a plurality of preference coefficients, with each preference coefficient of the plurality of preference coefficients associated with a respective attribute of a plurality of attributes; and
    using the character preference function for the user to select one or more media contents from among a plurality of media contents, wherein using the character preference function for the user to select one or more media contents from among a plurality of media contents comprises determining a character rating for a character in a given media content from among the plurality of media contents based on the character preference function for the user and a character model for the character and recommending, based on the character rating, the given media content to the user.

13. The non-transitory computer-readable medium of claim 12, wherein the set of acts further comprises:
    prompting the user to identify characters that the user likes; and
    based on the prompting, receiving the character preference data identifying the first character that the user likes.

14. The non-transitory computer-readable medium of claim 12, wherein the set of acts further comprises:
    accessing physiological recording data for the user; and determining the first character that the user likes using the physiological recording data for the user.

15. A computing system comprising a processor coupled to a memory, the computing system configured for performing a set of acts comprising:
  accessing character preference data for a user, wherein the character preference data identifies a first character that the user likes and a second character that the user dislikes, and wherein the first character and the second character appear in media content;
  accessing attribute values of the first character that the user likes;
  accessing attribute values of the second character that the user dislikes;
  determining, based on the attribute values of the first character and the attribute values of the second character, a character preference function for the user, wherein the character preference function comprises information identifying a plurality of preference coefficients, with each preference coefficient of the plurality of preference coefficients associated with a respective attribute of a plurality of attributes; and
  using the character preference function for the user to select one or more media contents from among a plurality of media contents, wherein using the character preference function for the user to select one or more media contents from among a plurality of media contents comprises determining a character rating for a character in a given media content from among the plurality of media contents based on the character preference function for the user and a character model for the character and recommending, based on the character rating, the given media content to the user.

16. The computing system of claim 15, wherein the set of acts further comprises:
  prompting the user to identify characters that the user likes; and
  based on the prompting, receiving the character preference data identifying the first character that the user likes.

17. The computing system of claim 15, wherein the set of acts further comprises:
  accessing physiological recording data for the user; and
  determining the first character that the user likes using the physiological recording data for the user.

* * * * *